Nov. 24, 1953
P. GERARD ET AL
2,660,484
FLUID BEARING
Filed July 8, 1950
3 Sheets-Sheet 1
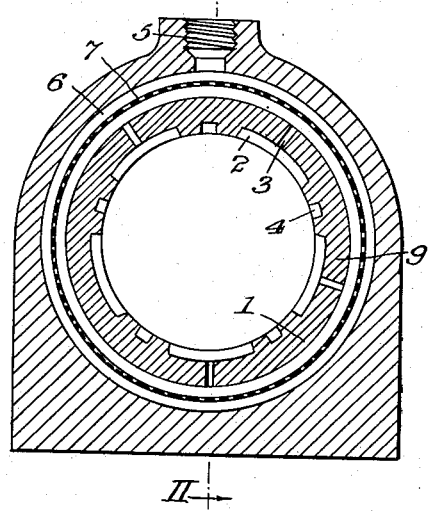
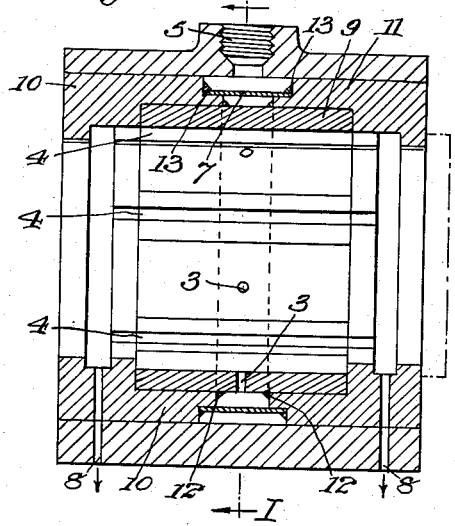
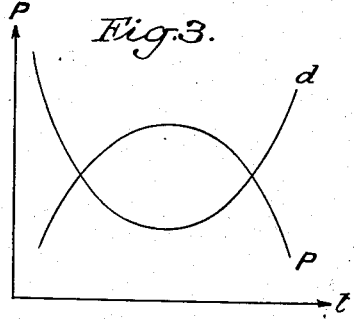
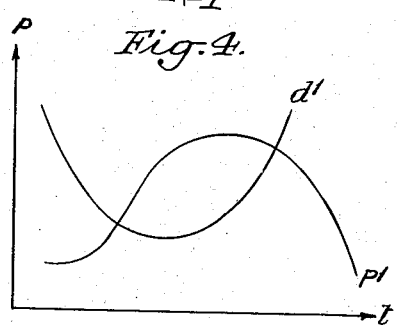
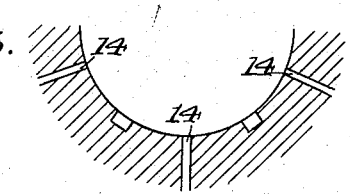
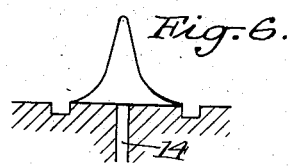
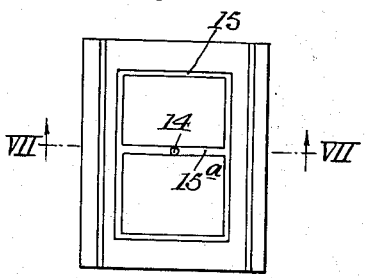
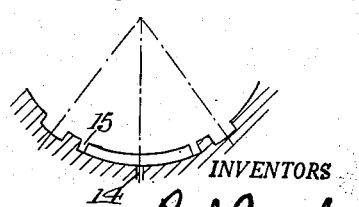
INVENTORS
Paul Gerard
Henri Deranne
by Brown + Deward
Attorneys Nov. 24, 1953

P. GERARD ET AL 2,660,484

FLUID BEARING

Filed July 8, 1950

INVENTORS
Paul Gerard
Henri Seranne
by Brown & Seward
Attorneys

Nov. 24, 1953  P. GERARD ET AL  2,660,484
FLUID BEARING
Filed July 8, 1950  3 Sheets-Sheet 3

INVENTORS
Paul Gerard
Henri Deranne
by Brown & Seward
Attorneys

Patented Nov. 24, 1953

2,660,484

UNITED STATES PATENT OFFICE 2,660,484

FLUID BEARING

Paul Gérard, Paris, and Henri Séranne, Villeurbanne, France, assignors to Gendron Freres, S. A., Villeurbanne, France, a company of France Application July 8, 1950, Serial No. 172,666

Claims priority, application France January 24, 1950

8 Claims. (Cl. 308—9)

In the U. S. patent application No. 699,051 of September 24, 1946 (abandoned following the filing on August 8, 1951, of continuation-in-part application Serial No. 240,959), there has been described a bearing capable of holding in an integral floating state, a movable and more particularly a rotatable element journalled therein or thereon, even at rest, said floating state being ensured by a pressure fluid layer interposed between at least a portion of the periphery of said element and the periphery of the bearing.

According to the above-mentioned patent application, it is possible to use as pressure fluid to form the above-mentioned layer, a liquid or a gas. A certain number of embodiments have been described in said application, but in these embodiments, the pressure fluid feeding always took place through chambers between which are provided substantially longitudinal grooves acting as fluid outlets.

We have found that the arrangements described in the above-mentioned application were capable of giving excellent results when the feeding fluid was a liquid, i. e. a fluid having a low compressibility. We have found, in particular, that even with relatively deep chambers receiving a relatively considerable volume of fluid, the rotatable element was supported without giving rise to sustained vibrations, even at very high speeds and even when subjected to a considerable load.

We have noted, however, that with the above-mentioned arrangements, appreciable sustained vibrations were to be observed when the feeding fluid was a compressed gas and, in particular, compressed air, i. e. a fluid having a high compressibility.

In particular, said vibrations become more and more prejudicial when the load acting upon the bearings is increased.

The main object of the invention is to provide a fluid bearing of the general type described in the above-mentioned application of Paul Gérard, i. e. of the type comprising feeding means to supply substantially longitudinal channels provided between the feeding zones, said bearing being characterized by the feature that the feeding zones, instead of being each constituted by one chamber, i. e. by a capacity filled with a pressure fluid, are each constituted by a system of grooves of small cross-section, said systems being separated from each other by said substantially longitudinal outlet channels.

We have found that with the new and novel arrangements according to the invention, the pressure of the feeding fluid is uniformly spread in the whole feeding zone through said system of grooves, the fluid thus forming a film capable of supporting the movable element without giving rise to sustained vibrations, even if said movable element is subjected to a considerable load resulting in substantial specific pressures.

It is to be understood that the device according to the invention may be used with any fluid and, in particular, with liquids, within the scope of the invention.

Nevertheless, it is particularly proposed to use said device with compressed gases and, in particular, with compressed air, the advantages resulting from the novel arrangements of the feeding zones being in this case, particularly marked.

Another object of the invention is to provide a compressed gas bearing and, in particular, a compressed air bearing, comprising at least one compressed gas feeding zone having the shape of a groove system similar to the so-called "oil groove system" separated by substantially longitudinal channels preferably having a larger section assuring, in conjunction with the first mentioned grooves, the exhaust of the gas.

The shape, arrangement, length and cross-section of the grooves as well as the mode of feeding the groove system with the compressed gas may be varied between wide limits within the scope of the invention. Thus, in particular, said grooves may be fed at one point or at a plurality of points so as to ensure more perfectly the spreading of the compressed gas in each supporting zone of the bearing.

According to one embodiment, the grooves may be arranged so as to form curvilinear rectangles limiting the feed zone, other grooves being preferably provided within said rectangles for feeding uniformly the whole zone limited by said rectangles. In particular, certain grooves may be arranged in a cross-like manner, so as to feed uniformly the active supporting zones.

According to another feature of the invention, the bearing is so designed as to balance the resultant of the external forces acting upon the rotary element i. e. the shaft and, in particular, gravity. According to this feature, the zones fed with a pressure fluid are so disposed that the symmetry plane of all supporting zones substantially contains said resultant.

According to still another feature of the invention, the supporting zones are provided only around a portion of the bearing periphery, viz. that against which the shaft tends to apply under the action of said resultant.

According to still another feature of the invention, the zones fed with the pressure fluid are arranged around the periphery of the bearing, said zones being of course separated by substantially longitudinal channels, said zones being fed in such a manner that the pressure existing in the zones resisting the resultant of the external forces, is preponderant. In particular, the above-mentioned zones may be designed in a particular manner or may be so fed that the fluid pressure in said zones is higher than in any other fed zones.

According to another feature of the invention, the bearing zones are fed in the vicinity of their centre.

According to one embodiment, the grooves of the feeding system are fed from a source of compressed gas through a suitable throttling.

According to another embodiment, said grooves are fed through diametrically opposed longitudinal grooves or channels. It is to be understood that the various feeding and outlet zones may be provided at will either on the outer surface of inner member, e. g., the shaft, or on the inner surface of the outer cylindrical member acting, e. g., as a bearing surface and surrounding said shaft.

The invention will be more easily understood with reference to the accompanying drawings showing, as a mere illustration, some embodiments of the invention.

In these drawings:

Figs. 1 and 2 are cross and axial sections, respectively, of a bearing of the type described in the above-mentioned patent application, i. e. of the type comprising chambers fed with a pressure fluid.

Fig. 3 is a diagram showing the curve of the radial displacement of a shaft journalled in a bearing of the type of Figs. 1 and 2, as a function of time, and the pressure curve in the same time, in the case when the fluid feeding said bearing is a liquid.

Fig. 4 is a similar diagram in the case when the fluid feeding the bearing is a gas.

Fig. 5 is a partial section of a fluid bearing in which the chambers fed with a pressure fluid are each substituted by a simple nozzle.

Fig. 6 is a pressure diagram in a bearing of the type shown in Fig. 5.

Fig. 7 is a partial section of a bearing according to the invention.

Fig. 8 is a partial development of the bearing shown in Fig. 7.

Figure 9:
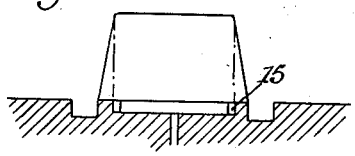
Fig. 9 is a pressure diagram in a bearing according to the invention.

Referring first to Figs. 1 to 4, there is shown at 1 a bearing the inner periphery of which is provided with a certain number (five, in the example shown) of chambers 2 fed with a pressure fluid through inlets 3 and having longitudinal outlet channels 4. The pressure fluid is admitted into the bearing at 5 and penetrates first into an annular chamber 6. A suitable cylindrical filter 7 is provided in said annular chamber with which the above-mentioned inlets 3 communicate. The exhaust of the fluid takes place through the above-mentioned channels 4 which communicate with outlet ports 8 (Fig. 2).

In Fig. 2 is shown, as a mere illustration, a constructive embodiment in which the cylindrical sleeve which constitutes the body of the bearing proper is made in three pieces, viz. a central ring 9 through which are drilled inlets 3, said ring being machined to form feeding zones 2 and outlet channels 4 and two collars 10 and 11 forced on either side on said cylindrical ring 9 and soldered on the same as indicated at 12. Channels 4 provided in ring 9 extend across parts of collars 10 and 11. Suitable shoulderings are provided as well between ring 9 and collars 10, 11 as on the latter proper, said shoulderings determining the upper and lower zones of the annular chamber 6 within which is interposed filter 7 soldered on the collars as indicated at 13. It will be first assumed that the fluid fed into chambers 2 is a liquid.

In Fig. 3 is shown a curve $d$ materializing as a function of time a given law of the shaft displacements in a well-defined transverse direction, e. g. under the action of the external forces. These displacements cause a variation of the resultant of the pressures exerted upon the shaft by the bearing. Curve $p$ materializes the variations of said resultant as a function of time. It may be seen from curves $d$ and $p$ that there is no delay between the displacements of the shaft and the pressure variations resulting therefrom. If, however, the fluid feeding the bearing is a gas (having a high compressibility) the pressure curve $p_1$ will be delayed with respect to the displacement curve $d_1$ (Fig. 4) and this time shift causes a sustained periodical motion of the shaft in the bearing even in the absence of any external force. This will be easily understood since, as the fluid feeding chambers 2 is compressible, the pressure increase due to the displacements will be necessarily delayed which will allow the shaft to move spontaneously with respect to the bearing, thus causing undesired vibrations.

A first solution would consist in suppressing completely chambers 2 and substituting therefore nozzles 14 as seen in Fig. 5. However, as shown in Fig. 6, the pressure curve would then present a peak along the axis of nozzle 14.

According to the invention, instead of suppressing chambers 2, the same are substituted by groove systems 15 (see Figs. 7, 8 and 9). With this arrangement, as shown in Fig. 9, the pressure curve offers a flat portion concentric to the bearing periphery, which gives the shaft a perfect stability. As mentioned above, the distribution of grooves 15 in each feeding zone may be varied between wide limits within the scope of the invention.

In Fig. 8, groove 15 forms a rectangle completed by a mid-groove 15a interconnecting the longer sides of said rectangle, inlet 14 then opening in the centre of said mid-groove 15a.

Figs. 10 to 13 show the development of the surface of a fluid bearing.

Figure 10:
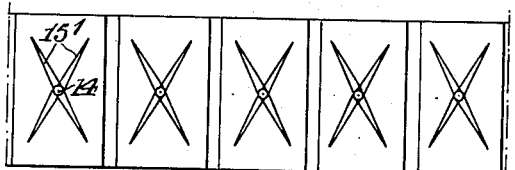
Figs. 10 to 13 show embodiments of a bearing according to the invention.

In Fig. 10, grooves 15' are arranged in a cross-like manner along the diagonals of the feeding zones and comprise narrower portions at their ends.

Figure 11:
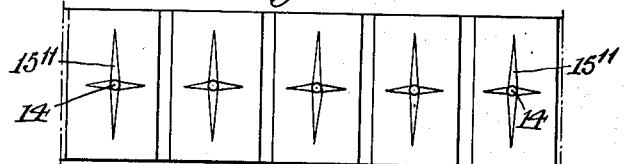

In Fig. 11, grooves 15'' are also arranged in a cross-like manner but along the medians of said zones.

Figure 12:
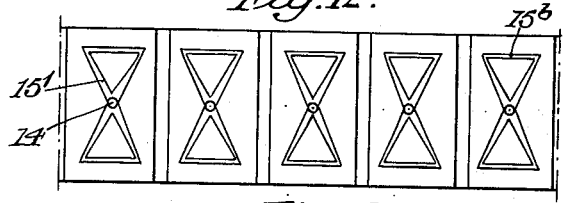

In Fig. 12, grooves 15' are also arranged in a cross-like manner as in Fig. 10, but the cross thus formed is completed by two grooves 15b interconnecting the ends of the arms thereof.

Figure 13:
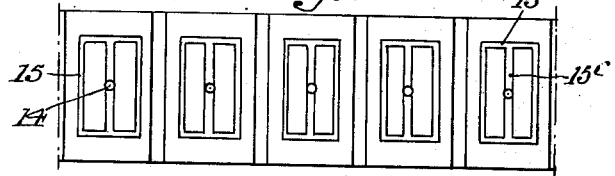

Finally, in Fig. 13, the network is constituted by a groove 15 in the shape of a rectangle completed, as in the case of Fig. 8, by a mid-groove 15c, the latter being disposed in a direction perpendicular to that of groove 15a of Fig. 8.

The invention is in no way limited to the above-mentioned examples or groove arrangement, the only essential condition being to provide a system of grooves having a small cross-section.

Figure 14:
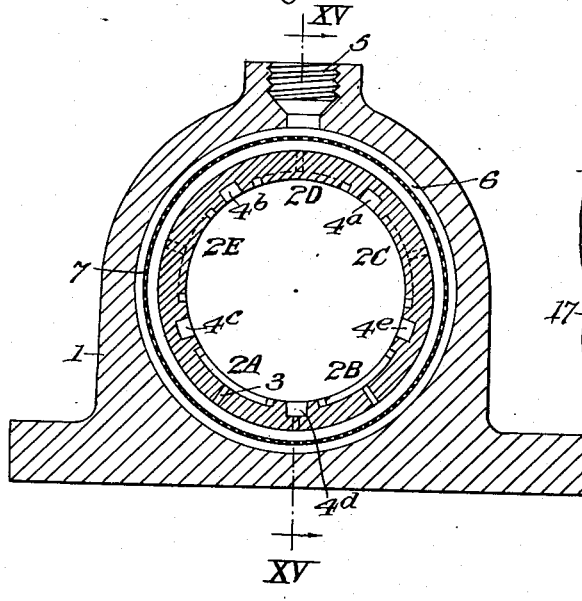
Figs. 14 and 15 are sectional views of a bearing according to the invention, Fig. 14 being a cross-section along axis XIV—XIV of Fig. 15, the latter being an axial section along axis XV—XV of Fig. 14.
Figure 15:
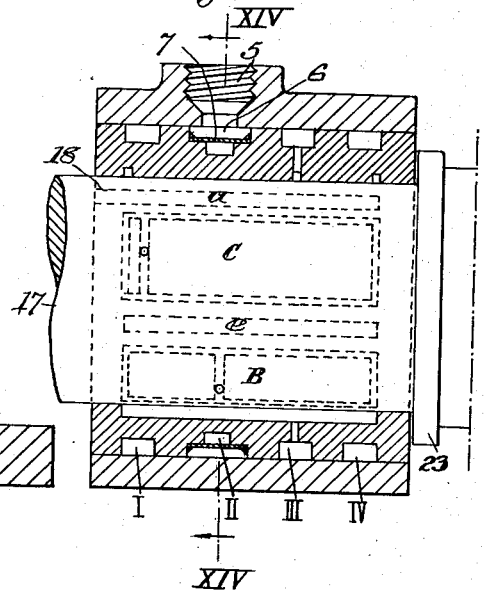
Figure 16:
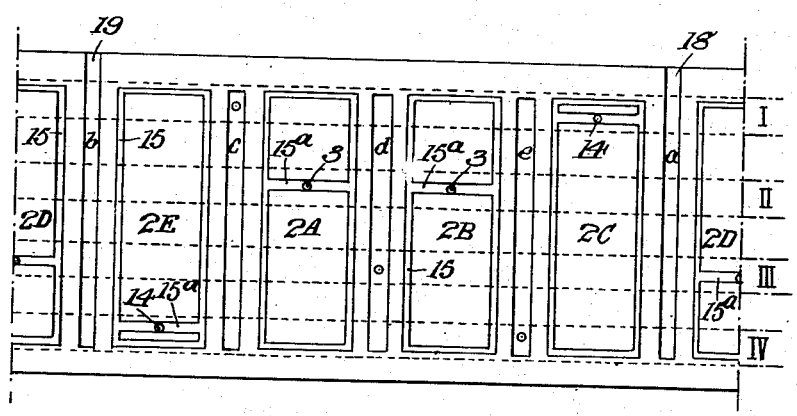
Fig. 16 shows the development of bearing of Figs. 14 and 15.

In Figs. 14 to 16, is shown as an illustration, a complete embodiment of an air bearing according to the invention.

In these figures, there is shown at 1 the body of the bearing, at 2 the peripherical feeding zones (five, in the example shown) designated by the letters A, B, C, D, E and at 3, ducts feeding zones 2 with a pressure fluid. The longitudinal outlet channels of the fluid are shown at 4, said channels being designated by letters a, b, c, d, e. 5 is as previously the inlet of the pressure fluid; 6 is the annual chamber and 7 the filter incorporated in said chamber. In this embodiment, there is provided, apart from the annular chamber 6, a series of annular grooves I, II, III, IV, groove II communicating directly with the above-mentioned annular chamber 6, and said grooves ensuring the communication between certain feeding zones and outlet channels through ducts 3, as described in detail hereafter. The shaft which is journalled in bearing 1 is shown at 17.

In Fig. 16 is shown the development of the feeding zones A to E and that of the outlet channels a to e. The dotted line longitudinal strips numbered from I to IV show the above-mentioned annular grooves. The lower feeding zones A and B which have to balance the action of gravity should be fed at a higher pressure than the other zones. For this purpose, both zones A and B are connected in parallel with the annular groove II fed directly from chamber 6 and the other feeding zones are only fed downstream from said zones A and B and in series with the same. This series-feeding is obtained in the following manner: the fluid evacuated from the feeding zone A on either side thereof through channels c and d, is brought into feeding zones C and D, respectively, through annular grooves I and III, respectively. Similarly, the fluid evacuated from zone B through channels d and e is brought into zones D and E, respectively, through annular grooves III and IV, respectively.

The evacuation of the pressure fluid from zone C takes place through channel a; the evacuation of the fluid from zone E takes place through channel b; finally, the evacuation of the fluid from zone D takes place through channels a and b, simultaneously, the latter opening directly outside at 18 and 19, respectively. As shown in particular in Fig. 15, the shaft may be provided with a flange 23, so that the leakage fluid from the edges of the feeding zones forms between the shaft end and flange 23 a film preventing the flange from coming into direct contact with the bearing, the pressure in said annular zone automatically increasing as the clearance decreases.

Figure 17:
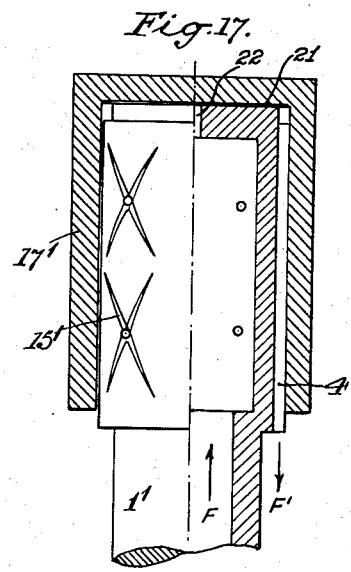
Fig. 17 is a half elevational view of a vertical bearing according to the invention and, Figs. 18 and 19 show the bearing adapted to support a shaft which is carried around a portion only of its periphery instead of being completely surrounded by the bearing.

In Fig. 17, is shown a pivot bearing 1' according to the invention, used as a thrust bearing adapted to bear a vertical rotor 17'. In this example, as shown on the left-hand half of the figure, the grooves 15' are arranged around the diagonals of the feeding zones, but on the outer surface of pivot 1' and not as previously on the inner surface of the bearing. The incoming of the pressure fluid indicated by arrow F takes place through the face of pivot 1' which is hollow in this embodiment and the evacuation of said fluid is effected as indicated by arrow F' through each outlet channel 4'. The axial floating of the rotor is ensured by a pressure film 21 interposed between the terminal face of pivot 1' and the bottom of rotor 17'. This film is continuously sustained by the fluid flowing through a throttling 22. In order to improve the efficiency of the axial sustentation device, it is possible to provide in either one of the plane surfaces limiting film 21 a groove system similar to those described hereabove.

Figure 18:
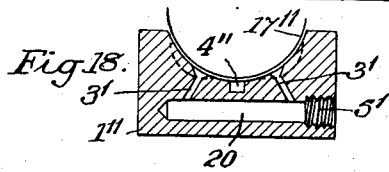
Figure 19:
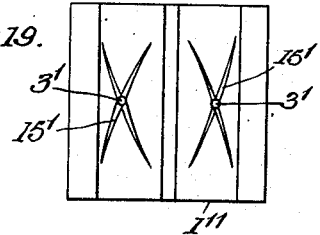

In the alternative embodiment shown in Figs. 18 and 19, shaft 17'' instead of being surrounded by bearing 1'' rests on the same around a portion only of its periphery. Grooves 15' are in this alternative embodiment arranged on the bearing (pillow-block) in a cross-like manner and along the diagonals of the feeding chambers; these grooves are fed through inlets 3' fed in turn by a duct 20 on which is screwed at 5' the pressure fluid inlet piping. A pressure fluid outlet channel is shown at 4''.

What is claimed is:

1. A bearing structure adapted to support a rotor member by pressure of a low viscosity fluid continuously supplied thereto at a relatively high volumetric rate, said bearing structure comprising a rotor and a member concentric to said rotor and interfitting therewith with a clearance therebetween, a plurality of circumferentially spaced and separated pressure zones between said concentric members, each said zone having formed in one of said members inlets for conducting said pressure fluid to one or more localized points therein, at least one groove extending along a surface of said zone from each said inlet and arranged to receive pressure fluid directly from said inlet and to distribute said fluid substantially uniformly throughout a major part of said zone, and axially extending outlet channels separating said pressure zones and adapted to receive and evacuate the pressure fluid from said zones at said relatively high rate, a major part of the area of each pressure zone being constituted by concentric surfaces of the movable members spaced no farther apart than the maximum clearance between said members and said pressure zones constituting the major portion of the areas of the interfitting portions of said members whereby a substantially uniform high fluid pressure is maintained throughout the area of each of said zones to resist relative radial movement of said members.

2. A bearing structure according to claim 1 in which there are a plurality of grooves of relatively small cross-section radiating in different directions from each inlet.

3. A bearing structure according to claim 2 which includes, in each pressure zone, another groove of relatively small cross-section communicating with the ends of said plurality of grooves.

4. A bearing structure according to claim 2 in which the grooves are of progressively decreasing cross-section.

5. A bearing structure according to claim 2 in which four grooves radiate from each feeding nozzle in an X-shaped pattern.

6. A bearing structure according to claim 1 in which one of the movable members is a shaft, the other movable member is a pillow block surrounding said shaft on only a portion of its periphery, and in which the pressure fluid feeding nozzles, the grooves and the outlet channels are formed in said pillow block.

7. A bearing structure according to claim 1 in which one of the movable members is subjected to an external force acting in a substantially constant radial direction, and which includes means for feeding pressure fluid directly to the inlet of at least one pressure zone located in a position to resist said external force, and means for feeding pressure fluid to the inlet of at least one other pressure zone from an outlet channel adjacent said first-named zone.

8. A bearing structure according to claim 1 in which one of the movable members is subjected to an external force acting in a substantially constant radial direction, and which includes means for feeding pressure fluid directly to the inlets of two pressure zones located in a position to resist said external force, means for feeding pressure fluid to the inlets of two other pressure zones from outlet channels adjacent said first-named zones, and means for feeding pressure fluid to the inlet of a pressure zone located in a position opposite to the direction of said external force from an outlet channel between said first-named zones.

PAUL GÉRARD.
HENRI SÉRANNE.

References Cited in the file of this patent

UNITED STATES PATENTS

| Number | Name | Date |
| --- | --- | --- |
| 2,449,297 | Hoffer | Sept. 14, 1948 |
| 2,459,826 | Martellotti | Jan. 25, 1949 |
| 2,495,516 | Foster | Jan. 24, 1950 |
| 2,578,711 | Martellotti | Dec. 18, 1951 |

FOREIGN PATENTS

| Number | Country | Date |
| --- | --- | --- |
| 454,557 | Canada | Feb. 15, 1949 |
| 553,673 | Great Britain | June 1, 1943 |